Oct. 5, 1943.　　　B. E. LENEHAN　　　2,331,205
GRAPHIC MEASURING DEVICE
Filed Oct. 31, 1941
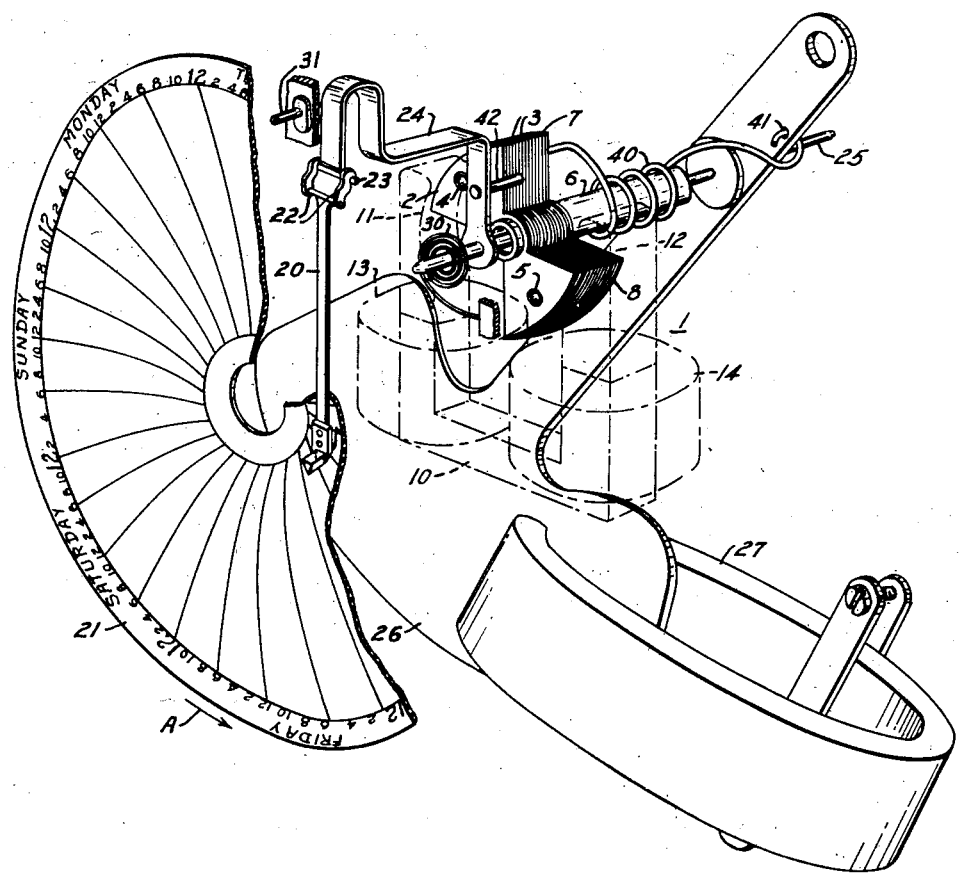
WITNESSES:
INVENTOR
Bernard E. Lenehan.
ATTORNEY Patented Oct. 5, 1943

2,331,205

UNITED STATES PATENT OFFICE 2,331,205

GRAPHIC MEASURING DEVICE

Bernard E. Lenehan, Bloomfield, N. J., assignor to Westinghouse Electric & Manufacturing Company, East Pittsburgh, Pa., a corporation of Pennsylvania Application October 31, 1941, Serial No. 417,363

4 Claims. (Cl. 234—72)

This invention relates to measuring devices, and it has particular relation to graphic devices for measuring variable electrical quantities.

In conventional measuring devices, an indicating member, such as a pointer or pen, generally is rigidly connected to the moving part of a measuring instrumentality. As a specific example, the measuring instrumentality may take the form of an ammeter movement.

If the variable quantity being measured varies slowly, a rigid connection between the indicating member and the moving part of the measuring instrumentality is satisfactory. However, if the measuring instrumentality is subjected to sudden variations in the quantity being measured, certain objectionable results have been experienced. The rapid acceleration imparted to the indicating member may suffice to bend the indicating member, which generally is of light construction. In addition, the rapid movement may be of sufficient magnitude to throw the indicating member violently against a stop or other fixed part of the measuring instrumentality. This may cause further bending or jamming of the indicating member or associated parts.

If the measuring device is in the form of a graphic instrument, sudden movements or stoppages of the pen tend to throw ink from the pen over the associated chart or parts of the measuring device.

In accordance with the invention, the indicating member, such as a pointer or a pen, is coupled to the moving part of a measuring instrumentality through a yieldable or resilient coupling. Such a coupling permits the indicating member to lag behind a sudden change in the position of the associated moving part of the measuring instrumentality. Consequently, the indicating member may be designated to move at a rate sufficiently slow to avoid bending thereof and to avoid throwing of ink, in the case of a graphic measuring device.

When a control spring is employed on the measuring device for biasing the moving part towards a predetermined position, the resilient coupling preferably is designed to exert a torque between the indicating member and the moving part which is substantially greater than the torque exerted by the control spring.

The invention is particularly suitable for graphic measuring devices, wherein a pen is provided with a damping mechanism. Such damping mechanism cooperates with the resilient coupling to assure a reasonably slow movement of the pen.

It is, therefore, an object of the invention to provide a measuring device having an indicating member for indicating the value of a variable quantity, with means for preventing an excessive rate of movement of the indicating member.

It is a further object of the invention to provide a measuring device wherein an indicating member is resiliently coupled to the moving part of a measuring instrumentality.

It is a further object of the invention to provide a measuring device wherein an indicating member is resiliently coupled to the moving part of a measuring instrumentality, and wherein a control spring capable of developing a torque less than that of the resilient coupling is provided for biasing the moving part towards a predetermined position.

It is a still further object of the invention to provide a graphic measuring device having a pen coupled to the rotating part of a measuring instrumentality through a resilient spring and having a damping mechanism associated with the pen for opposing motion thereof.

Other objects of the invention will be apparent from the following description taken in conjunction with the accompanying drawing, in which the single figure is a view in perspective, with parts broken away, of a measuring device embodying the invention.

Referring to the drawing, the single figure shows a measuring instrumentality 1 which may be of any suitable construction. In the specific embodiment herein disclosed, the measuring instrumentality is a moving iron instrument having a movable part, such as a rotatable armature 2. This armature may be constructed in any suitable manner. Conveniently, the armature may be formed of a plurality of magnetic laminations 3 of soft iron or steel which are fastened together in any suitable manner, as by hollow rivets 4 and 5. The armature 2 may be mounted on a sleeve 6 for rotation therewith, and has arcuate pole faces 7 and 8.

For actuating the armature 2, an electromagnet is provided which includes a U-shaped magnetic core 10 having opposed pole faces 11 and 12 positioned to cooperate with the pole faces 7 and 8 of the armature 2. The magnetic core also may be formed of soft iron or steel laminations. The electromagnet also includes windings 13 and 14 which surround, respectively, the legs of the magnetic core 10. These windings are connected to a circuit for energization in accordance with an electrical quantity to be measured. The windings 13 and 14 are so connected that they tend to force magnetic flux between the pole faces 11 and 12 in the same direction.

For depicting movement of the armature 2, a suitable indicating member, such as a pointer or pen, may be associated therewith. For the purpose of illustration, a pen 20 is positioned for movement across the face of a suitable chart 21. This chart may be in the form of a circular disc mounted for rotation about its axis at a uniform rate by suitable means (not shown). The chart 21 may be designed to rotate at the rate of one revolution per week and may be divided into zones, each representing one of the days of the week. Each of the zones, in turn, may be divided further for indicating the hours of each of the days. The pen 20 is provided with spaced hooks 22 for engaging pins 23 carried by a pen bracket 24. The pen bracket is carried by a shaft 25 which is mounted for rotation in bearings (not shown).

For damping movements of the pen 20, a damping vane 26 may be carried by the shaft 25 for rotation therewith. This damping vane may be formed of an electro-conductive sheet of material, such as copper or aluminum. The vane 26 is positioned for movement between the poles of a permanent magnet 27. As well understood in the art, movement of the vane 26 between the poles develops a force opposing such rotation which is dependent upon the rate of movement of the vane.

The pen 20 is biased by means of a spring 30 towards one end of its path of movement. It will be assumed that the spring 30 operates to bias the pen 20 towards the axis of the chart 21. Energization of the windings 13 and 14 operates to urge the pen 20 away from the axis of the chart. The maximum movement of the pen 20 away from the axis of the chart 21 may be determined by a suitable fixed stop 31 positioned to engage the bracket 24.

In prior art graphic measuring devices, it has been customary to connect the bracket rigidly to the armature 2. Such a rigid connection is objectionable for the reasons previously set forth.

In accordance with the invention, the bracket 24 is yieldably or resiliently coupled to the armature 2 in any suitable manner, as by means of a helical spring 40. This spring may have one end positioned in an opening 41 provided in the damping vane 26. The remaining end of the spring 40 may be attached to the armature 2 in any suitable manner, as by introducing this end in the opening of the hollow rivet 4.

The bracket 24 carries a projecting portion in the form of a pin 42, which is positioned in the path of movement of the armature 2. As indicated in the drawing, the spring 40 is designed to urge the pin 42 into engagement with a surface of the armature 2. Preferably, the spring 40 is designed to exert a torque holding the pin 42 against the armature 2 which is substantially greater than the torque developed by the spring 30. In the specific construction herein disclosed, the spring 30 operates as a control spring for the measuring instrumentality 1. As representative of suitable values, the spring 40 may be designed to exert a torque, urging the pin 42 against the armature 2, which is approximately two and one-half to three times the value of the torque developed by the control spring 30. It should be observed that the armature 2 is mounted for rotation independently of rotation of the shaft 25. To this end, the sleeve 6, which supports the armature 2, may be positioned around the shaft 25 in rotatable engagement therewith.

It is believed that the operation of the invention is apparent from the foregoing description thereof. If it is desired to obtain a record of current flowing in an electrical conduit, the windings 13 and 14 are energized in accordance with such current, and the chart 21 is rotated about its axis in the direction of the arrow A in accordance with the time of the day. Consequently, the position of a line drawn by the pen 20 on the chart 21 indicates the magnitude of the current as a function of time.

If the current exciting the windings 13 and 14 varies in magnitude slowly, the spring 40 maintains the pin 42 in engagement with the armature 2 at all times, and the pen 20 moves directly with the armature 2.

Should the current exciting the windings 13 and 14 increase suddenly to a high value, such as five times the normal rated current of the measuring instrumentality 1, the armature 2 is urged rapidly into alignment with the magnetic field between the pole faces 11 and 12. Rotation of the pen 20, however, is opposed by two forces. The inertia of the pen assembly opposes sudden changes in the motion thereof. Moreover, the damping torque developed by the damping vane 26, in cooperation with the damping magnet 27, also tends to oppose movement of the pen 20. Under the influence of these forces, the spring 40 yields to permit the pen 20 to lag behind the rapid movement of the armature 2. Consequently, the pen 20 follows the armature 2 at a relatively slow rate of movement until the bracket 24 engages its stop 31.

When the current exciting the windings 13 and 14 drops below a predetermined value, which may be one and one-half to two times the rated current of the measuring instrumentality 1, the spring 40 returns the armature 2 into reengagement with the pin 42. However, since the bracket 24 generally is in engagement with its stop 31 at this instant, the movement of the armature 2 necessary to reengage the pin 42 is extremely small, and little shock results from such movement. For these reasons, the pen 20 is not subjected to excessive shock, and the throwing of ink by the pen is substantially eliminated.

Although the invention has been described with respect to certain specific embodiments, numerous modifications are possible. Therefore, the invention is to be restricted only by the appended claims when interpreted in view of the prior art.

I claim as my invention:

1. In a recording device, a measuring instrumentality having a part rotatable about an axis in accordance with a variable quantity to be measured, a pen assembly, means mounting said pen assembly for rotation about said axis independently of said part, damping means for said pen assembly, said pen assembly having a portion positioned in the path of rotation of said part, and means for resiliently biasing said portion into engagement with said part, said last-named means including a spring extending between said pen assembly and said part, whereby said pen assembly under the influence of said damping means may lag behind a rapid movement of said part in a predetermined direction of rotation.

2. In a recording device, a measuring instrumentality having a part rotatable about an axis between a first position and a second position in accordance with a variable quantity, a pen assembly, means mounting said pen assembly for rotation about said axis independently of said part, damping means for said pen assembly, said pen assembly having a portion positioned for engagement by said part as said part moves from said second to said first position, first means coupling said part to said portion for biasing said part in said engagement with said portion, and second means biasing said part towards said first position, said first means being designed to exert torque about said axis equal to at least twice the torque exerted by said second means about said axis, whereby said pen assembly under the influence of said damping means follows rapid movements of said part at a substantially slow rate of movement.

3. In a measuring device, a measuring instrumentality having a part movable in accordance with a variable quantity to be measured, an assembly for depicting movement of said part, means mounting said assembly for movement independently of said part, said assembly having a portion positioned in the path of movement of said part, means for resiliently urging said part and said portion towards each other, whereby said assembly may lag behind movement of said part in a predetermined direction, and means cooperating with a portion of said assembly for damping movements of said assembly, whereby the development of an excessive damping force increases the lag of said assembly behind said part.

4. In a recording device, a measuring instrumentality having a part rotatable about an axis between a first position and a second position in accordance with a variable quantity, a pen assembly, means mounting said pen assembly for rotation about said axis independently of said part, said pen assembly having a portion positioned for engagement by said part as said part moves from said second to said first position, first means coupling said part to said portion for biasing said part in said engagement with said portion, second means biasing said part towards said first position, and means responsive to the rate of rotation of said pen assembly for damping rotation of said pen assembly, whereby said damping means and the inertia of said pen assembly create a substantial lag of said pen assembly behind a rapid movement of said part from said first position towards said second position.

BERNARD E. LENEHAN.